United States Patent
Oiwa et al.

(10) Patent No.: US 10,060,396 B2
(45) Date of Patent: Aug. 28, 2018

(54) AIR INTAKE APPARATUS

(71) Applicant: AISIN SEIKI KABUSHIKI KAISHA, Kariya-shi, Aichi-ken (JP)

(72) Inventors: Toshiyuki Oiwa, Handa (JP); Masato Ishii, Kariya (JP); Motonobu Hasegawa, Kariya (JP)

(73) Assignee: AISIN SEIKI KABUSHIKI KAISHA, Kariya-Shi, Aichi-Ken (JP)

(*) Notice: Subject to any disclaimer, the term of this patent is extended or adjusted under 35 U.S.C. 154(b) by 480 days.

(21) Appl. No.: 14/655,247

(22) PCT Filed: Sep. 24, 2013

(86) PCT No.: PCT/JP2013/075640
§ 371 (c)(1),
(2) Date: Jun. 24, 2015

(87) PCT Pub. No.: WO2014/122816
PCT Pub. Date: Aug. 14, 2014

(65) Prior Publication Data
US 2015/0330340 A1  Nov. 19, 2015

(30) Foreign Application Priority Data
Feb. 5, 2013  (JP) ................. 2013-020568

(51) Int. Cl.
*F02M 35/10* (2006.01)
*F02B 27/02* (2006.01)
(Continued)

(52) U.S. Cl.
CPC ... *F02M 35/10255* (2013.01); *F02B 27/0215* (2013.01); *F02B 27/0263* (2013.01);
(Continued)

(58) Field of Classification Search
USPC .................................................. 123/184.38
See application file for complete search history.

(56) References Cited

U.S. PATENT DOCUMENTS

2006/0011168 A1   1/2006  Hanasato

FOREIGN PATENT DOCUMENTS

JP        6-173695 A      6/1994
JP        06173695 A  *   6/1994
(Continued)

OTHER PUBLICATIONS

Machine Translation of JP06173695A PDF File Name: "JP06173695A_MachineTranslation.pdf".*
(Continued)

*Primary Examiner* — Lindsay Low
*Assistant Examiner* — Ruben Picon-Feliciano
(74) *Attorney, Agent, or Firm* — Buchanan Ingersoll & Rooney PC

(57) ABSTRACT

In this air intake apparatus, a plurality of respective air intake ports include sealing surfaces that include inner wall surfaces with which valve bodies come into contact at the closed positions of the valve bodies, and the rotation angles of valve bodies located on a side relatively close to a drive source from their open positions to their closed positions are larger than the rotation angles of valve bodies located on a side relatively opposite to the drive source when a plurality of valve bodies are rotated from their open positions to their closed positions.

8 Claims, 7 Drawing Sheets

(51) Int. Cl.
    *F02D 9/10*       (2006.01)
    *F02M 35/112*    (2006.01)
(52) U.S. Cl.
    CPC ........ *F02B 27/0273* (2013.01); *F02D 9/1015*
            (2013.01); *F02D 9/1095* (2013.01); ***F02M
            35/1015*** (2013.01); *F02B 27/0294* (2013.01);
                *F02M 35/112* (2013.01); *Y02T 10/146*
                                                    (2013.01)

(56) References Cited

FOREIGN PATENT DOCUMENTS

| | | | |
|---|---|---|---|
| JP | 2004-169628 | A | 6/2004 |
| JP | 2010-001847 | A | 1/2010 |
| JP | 2011-074760 | A | 4/2011 |
| JP | 2011074760 | A * | 4/2011 |

OTHER PUBLICATIONS

Machine Translation of JP2011074760A PDF File Name: "JP2011074760A_Machine_Translation.pdf".*

International Search Report (PCT/ISA/210) dated Dec. 17, 2013, by the Japanese Patent Office as the International Searching Authority for International Application No. PCT/JP2013/075640.

Written Opinion (PCT/ISA/237) dated Dec. 17, 2013, by the Japanese Patent Office as the International Searching Authority for International Application No. PCT/JP2013/075640.

* cited by examiner

FIG.6    SECTIONAL VIEW TAKEN ALONG AXIAL DIRECTION OF VALVE BODY

FIG. 7 STATE WHERE VALVE BODY FARTHEST FROM ACTUATOR COMES INTO CONTACT WITH SEALING SURFACES (FIRST EMBODIMENT)
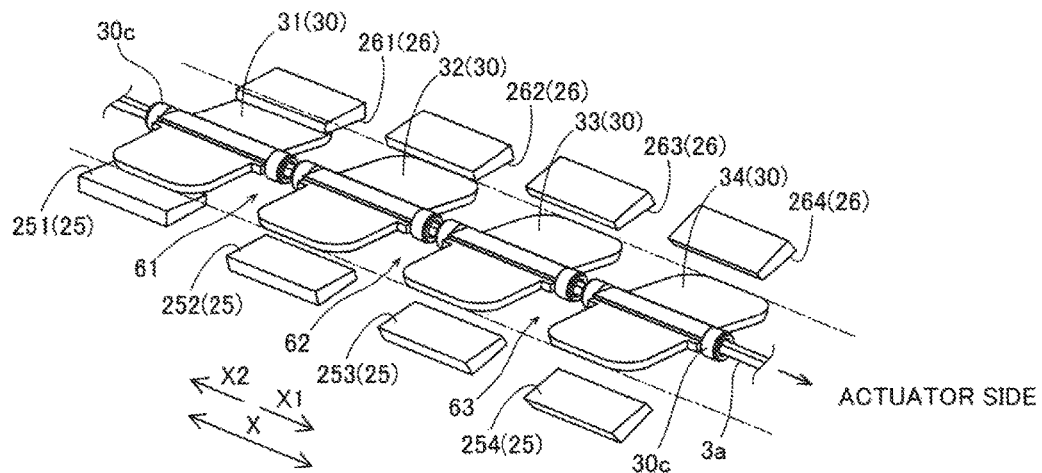
FIG. 8 ROTATION ANGLES θ1 TO θ4 OF FOUR VALVE BODIES FROM OPEN POSITIONS TO CLOSED POSITIONS (FIRST EMBODIMENT)
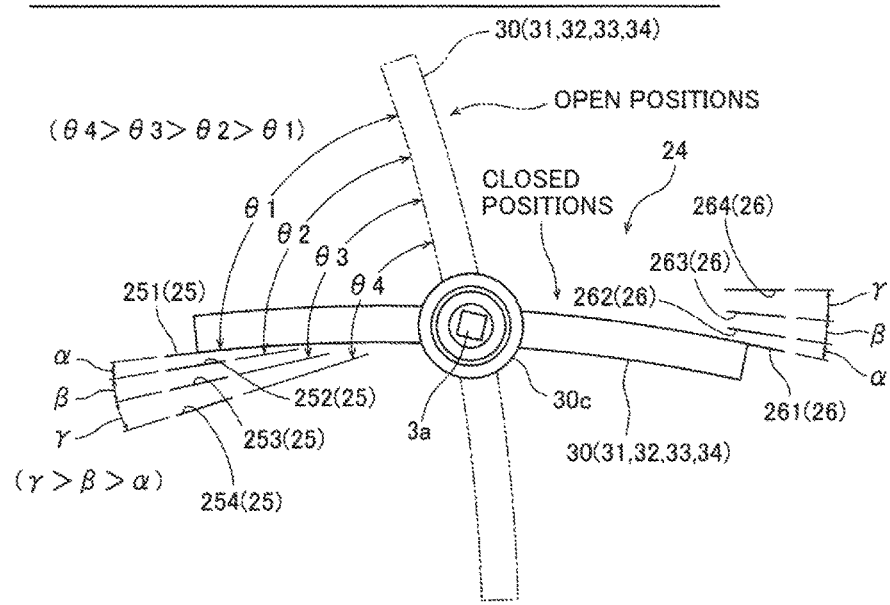

FIG.9 ROTATION ANGLES $\theta 11$ TO $\theta 14$ OF FOUR VALVE BODIES FROM OPEN POSITIONS TO CLOSED POSITIONS (SECOND EMBODIMENT)
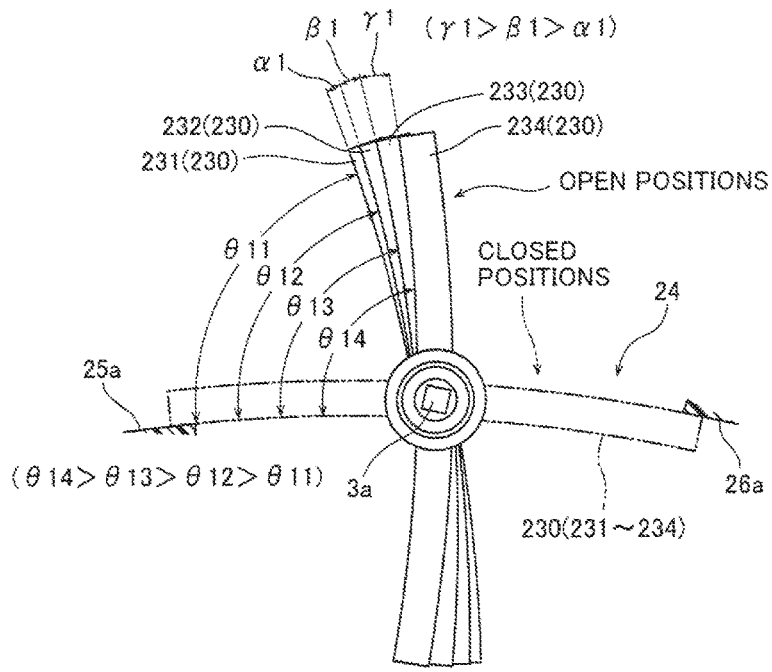
FIG.10 FIRST MODIFICATION IN WHICH PROTRUSION HEIGHTS OF SEAL LIPS ARE MADE DIFFERENT FROM EACH OTHER
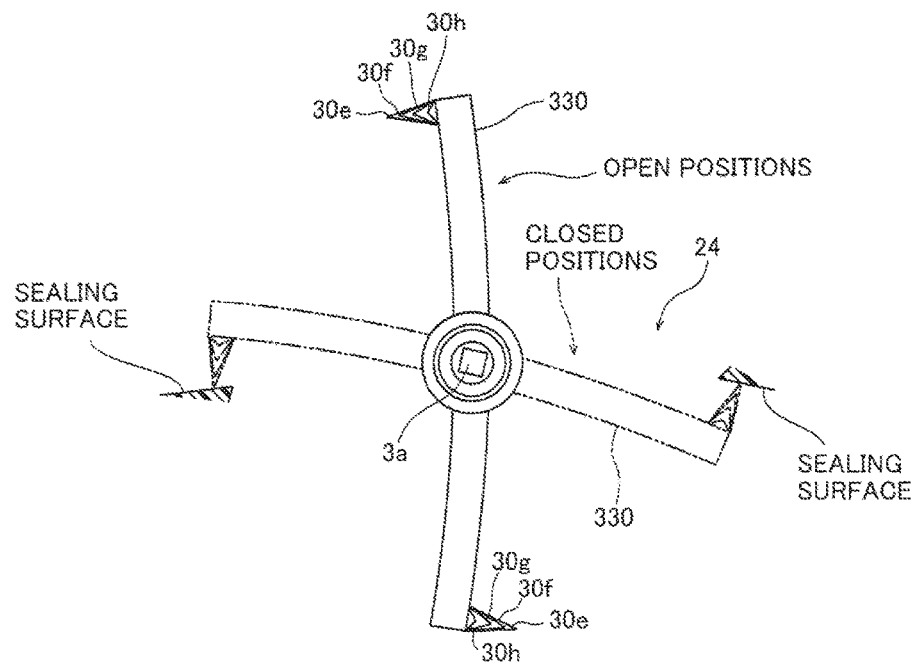

FIG.11  SECOND MODIFICATION IN WHICH SHAFT PORTIONS OF
ADJACENT VALVE BODIES ARE DIRECTLY CONNECTED TO EACH OTHER
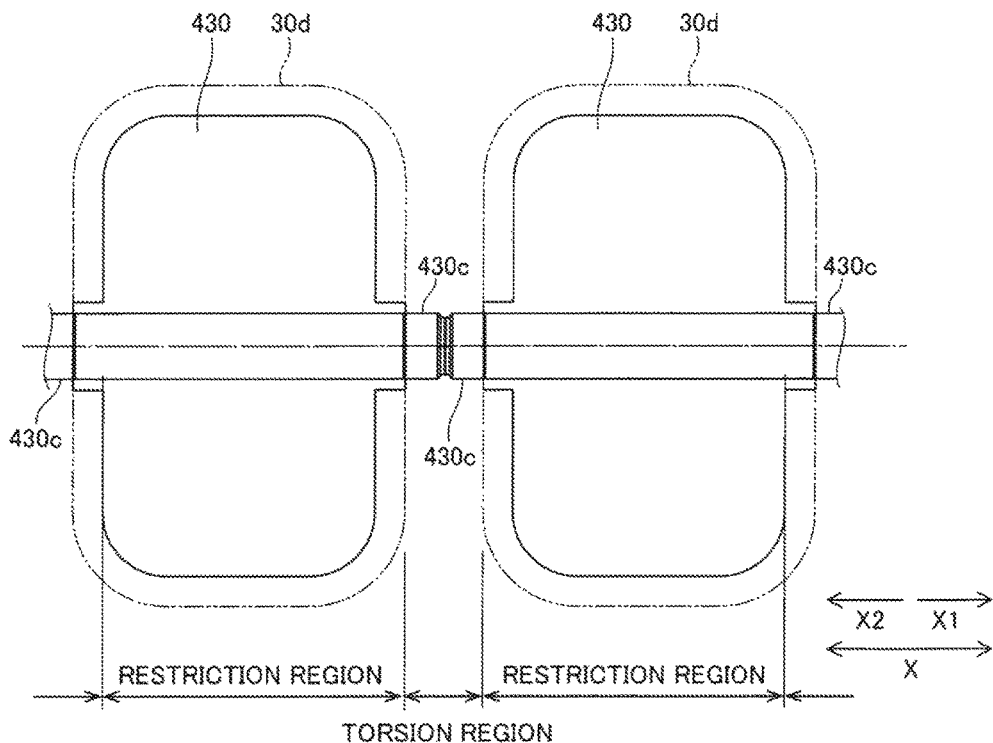
FIG.12  THIRD MODIFICATION IN WHICH NO INCREASED INNER DIAMETER PORTION
IS PROVIDED IN VALVE BODY
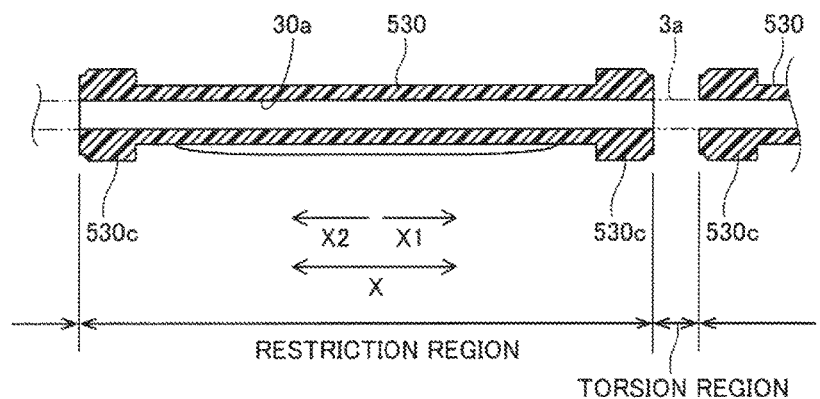

AIR INTAKE APPARATUS

TECHNICAL FIELD

The present invention relates to an air intake apparatus.

BACKGROUND ART

In general, an air intake apparatus including a plurality of valve bodies is known. Such an air intake apparatus is disclosed in Japanese Patent Laying-Open No. 2010-1847, for example.

In the aforementioned Japanese Patent Laying-Open No. 2010-1847, there is disclosed an air intake apparatus including four valve bodies arranged in respective four air intake pipe portions, rotated between their open positions and closed positions, a shaft that rotates together with the four valve bodies, and a common actuator that are connected to one end of the shaft and rotationally drives the four valve bodies. The four air intake pipe portions are provided with sealing surfaces with which the valve bodies come into contact at their closed positions. According to Japanese Patent Laying-Open No. 2010-1847, the four valve bodies are rotated between their open positions and closed positions, whereby the air intake path length of the air intake pipe portions is changed, and the air intake efficiency is improved. Although not specified in the aforementioned patent document 1, this air intake apparatus is conceivably configured (designed) such that the four valve bodies come into contact with the corresponding sealing surfaces at the same timing when the common actuator rotates the four valve bodies from their open positions to their closed positions.

PRIOR ART

Patent Document

Patent Document 1: Japanese Patent Laying-Open No. 2010-1847

SUMMARY OF THE INVENTION

Problem to be Solved by the Invention

In the air intake apparatus according to the aforementioned Japanese Patent Laying-Open No. 2010-1847, however, the timing at which the four valve bodies come into contact with the corresponding sealing surfaces may conceivably vary by variations in the manufacturing dimensions of the valve bodies or the sealing surfaces. In this case, when a valve body of the four valve bodies located on a side relatively close to the actuator first comes into contact with sealing surfaces, no drive force is then transmitted from the actuator to valve bodies located on a side relatively opposite to the actuator. Consequently, there is such a disadvantage that the valve bodies on the side relatively opposite to the actuator do not properly come into contact with sealing surfaces. Thus, in the air intake apparatus according to the aforementioned Japanese Patent Laying-Open No. 2010-1847, the air intake path length cannot conceivably be properly changed due to the variations in the dimensions of the valve bodies or the sealing surfaces, and hence there is conceivably such a problem that the air intake efficiency is reduced.

The present invention has been proposed in order to solve the aforementioned problem, and an object of the present invention is to provide an air intake apparatus capable of suppressing a reduction in air intake efficiency resulting from variations in the dimensions of valve bodies or sealing surfaces.

Means for Solving the Problem

In order to attain the aforementioned object, an air intake apparatus according to an aspect of the present invention includes a plurality of air intake ports, a plurality of valve bodies arranged in the plurality of respective air intake ports, rotated between their open positions and their closed positions, a rotating shaft that rotates together with the plurality of valve bodies, and a common drive source that is connected to the rotating shaft and rotationally drives the plurality of valve bodies. The plurality of respective air intake ports include sealing surfaces that include inner wall surfaces with which the valve bodies come into contact at the closed positions of the valve bodies, and the rotation angles of valve bodies located on a side relatively close to the drive source from their open positions to their closed positions are larger than the rotation angles of valve bodies located on a side relatively opposite to the drive source when the plurality of valve bodies are rotated from their open positions to their closed positions.

In the air intake apparatus according to the aspect of the present invention, as hereinabove described, the rotation angles of the valve bodies located on the side relatively close to the drive source from their open positions to their closed positions are larger than the rotation angles of the valve bodies located on the side relatively opposite to the drive source when the plurality of valve bodies are rotated from their open positions to their closed positions. Thus, even when variations in the dimensions of the valve bodies or the sealing surfaces are generated, the rotation angles of the valve bodies on the side relatively opposite to the drive source are small, and hence the valve bodies on the side relatively opposite to the drive source can be brought into contact with the sealing surfaces before the valve bodies on the side relatively close to the drive source. In the case where the valve bodies on the side relatively opposite to the drive source come into contact with the sealing surfaces before the valve bodies on the side relatively close to the drive source, drive force can continue to be transmitted from the drive source to the valve bodies on the side close to the drive source even after the valve bodies on the side opposite to the drive source come into contact with the sealing surfaces, unlike the case where the valve bodies on the side close to the drive source first come into contact with the sealing surfaces. Thus, the valve bodies on the side close to the drive source are further rotated, whereby both the valve bodies on the side opposite to the drive source and the valve bodies on the side close to the drive source can be brought into contact with the sealing surfaces. More specifically, in this air intake apparatus, the rotation angles of the valve bodies located on the side relatively close to the drive source are made larger than the rotation angles of the valve bodies located on the side relatively opposite to the drive source, whereby a reduction in air intake efficiency resulting from variations in the dimensions of the valve bodies or the sealing surfaces can be suppressed.

In the aforementioned air intake apparatus according to the aspect, the rotation angles of the valve bodies located on the side relatively close to the drive source are preferably larger than the rotation angles of the valve bodies located on the side relatively opposite to the drive source such that the valve bodies located on the side relatively close to the drive source come into contact with the corresponding sealing surfaces after the valve bodies located on the side relatively opposite to the drive source come into contact with the corresponding sealing surfaces when the plurality of valve bodies are rotated from their open positions to their closed positions. According to this structure, the valve bodies on the side relatively opposite to the drive source can be reliably brought into contact with the sealing surfaces before the valve bodies on the side relatively close to the drive source even when variations in the dimensions of the valve bodies or the sealing surfaces are generated, and hence both the valve bodies on the side close to the drive source and the valve bodies on the side opposite to the drive source can be more reliably brought into contact with the sealing surfaces.

In this case, positions where the plurality of valve bodies come into contact with a plurality of sealing surfaces are preferably made different from each other such that the valve bodies located on the side relatively close to the drive source come into contact with the corresponding sealing surfaces after the valve bodies located on the side relatively opposite to the drive source come into contact with the corresponding sealing surfaces. According to this structure, the rotation angles of the valve bodies on the side close to the drive source can be easily made larger than the rotation angles of the valve bodies on the side opposite to the drive source simply by making the positions where the plurality of valve bodies come into contact with the plurality of sealing surfaces different from each other, and hence the valve bodies on the side opposite to the drive source can be easily brought into contact with the sealing surfaces before the valve bodies on the side close to the drive source. Furthermore, unlike the case where the rotation angles of the plurality of valve bodies are made different from each other by providing the plurality of valve bodies in phases (rotation angular positions) different from each other at their open positions, the plurality of valve bodies can be provided in a prescribed phase (same phase) where pressure losses in air intake are hardly increased at their open positions, and hence pressure losses in air intake in the open states can be suppressed from being increased by the plurality of valve bodies.

In the aforementioned structure in which the positions where the plurality of valve bodies come into contact with the plurality of sealing surfaces are made different from each other, the plurality of valve bodies preferably include a plurality of sealing members that are arranged in respective outer peripheral portions of the plurality of valve bodies, come into contact with the corresponding sealing surfaces, have the same shape, and are elastically deformable, and the positions where the plurality of valve bodies come into contact with the plurality of sealing surfaces are preferably made different from each other such that the sealing members of the valve bodies located on the side relatively close to the drive source come into contact with the corresponding sealing surfaces after the sealing members of the valve bodies located on the side relatively opposite to the drive source come into contact with the corresponding sealing surfaces. According to this structure, the plurality of sealing members that are elastically deformable and have the same shape are brought into contact with the sealing surfaces sequentially from the side opposite to the drive source to the side close to the drive source, whereby sealing performance between the valve bodies and the sealing surfaces can be improved by the elastic deformation of the sealing members, and hence a reduction in air intake efficiency resulting from variations in the dimensions of the valve bodies or the sealing surfaces can be further suppressed.

In the aforementioned structure in which the positions where the plurality of valve bodies come into contact with the plurality of sealing surfaces are made different from each other, the plurality of valve bodies arranged in the plurality of respective air intake ports are preferably configured to be rotationally driven by the drive source in the same phase without providing differences in rotation angle, and the rotating shaft is preferably configured to be torsionally deformable when the valve bodies located on the side relatively close to the drive source come into contact with the corresponding sealing surfaces. According to this structure, even in the case where the plurality of valve bodies are rotationally driven by the drive source in the same phase, the valve bodies on the side close to the drive source can be further rotated, using the torsional deformation of the rotating shaft after the valve bodies on the side relatively opposite to the drive source come into contact with the sealing surfaces, and hence both the valve bodies on the side close to the drive source and the valve bodies on the side opposite to the drive source can be easily brought into contact with the corresponding sealing surfaces.

In the aforementioned air intake apparatus according to the aspect, there are preferably three or more of the air intake ports and three or more of the valve bodies, and of at least two of the three or more valve bodies, the rotation angle of the valve body located on the side relatively close to the drive source is preferably larger than the rotation angle of the valve body located on the side relatively opposite to the drive source. According to this structure, even in the case where there are three or more of the air intake ports and three or more of the valve bodies, of at least two of them, both the valve body on the side close to the drive source and the valve body on the side opposite to the drive source can be brought into contact with the corresponding sealing surfaces, and the sealing performance can be ensured.

In this case, the rotation angles of the plurality of valve bodies from their open positions to their closed positions are preferably increased in order from the valve body farthest from the drive source to the valve body closest to the drive source such that the valve bodies come into contact with the corresponding sealing surfaces in order from the valve body farthest from the drive source to the valve body closest to the drive source. According to this structure, even in the case where there are three or more of the air intake ports and three or more of the valve bodies, of all the valve bodies, the valve bodies on the side relatively opposite to the drive source can be brought into contact with the sealing surfaces before the valve bodies on the side relatively close to the drive source, and hence all the three or more valve bodies can be effectively brought into contact with the corresponding sealing surfaces.

In the aforementioned structure in which the rotation angles of the plurality of valve bodies are increased in order to the valve body closest to the drive source, positions where the plurality of valve bodies come into contact with the plurality of sealing surfaces are preferably made different from each other such that the rotation angles of the plurality of valve bodies from their open positions to their closed positions are increased in order from the valve body farthest from the drive source to the valve body closest to the drive source. According to this structure, even in the case where there are three or more of the air intake ports and three or more of the valve bodies, of all the valve bodies, the valve bodies on the side relatively opposite to the drive source can be easily brought into contact with the sealing surfaces before the valve bodies on the side relatively close to the drive source simply by making the positions where the plurality of valve bodies come into contact with the plurality of sealing surfaces different from each other.

In the aforementioned structure in which the rotation angles of the plurality of valve bodies are increased in order to the valve body closest to the drive source, the rotation angles of the plurality of valve bodies from their open positions to their closed positions are preferably increased in order from the valve body farthest from the drive source to the valve body closest to the drive source, and angular intervals are preferably increased in order from the valve body farthest from the drive source to the valve body closest to the drive source. According to this structure, even in the case where the valve bodies on the side close to the drive source are brought into contact with the sealing surfaces in order, using the torsional deformation of the rotating shaft after the valve body farthest from the drive source comes into contact with the sealing surfaces, the angular intervals are increased toward the side of the drive source where the amount of torsion of the rotating shaft is accumulated and increased, and hence the valve bodies on the side relatively close to the drive source can be suppressed from coming into contact with the sealing surfaces before the valve bodies on the side relatively opposite to the drive source due to the angular intervals smaller than cumulative amounts of torsion.

In the aforementioned air intake apparatus according to the aspect, the plurality of valve bodies preferably include a plurality of variable air intake valve bodies that are rotatably provided to open and close openings between a surge tank and the air intake ports arranged downstream of the surge tank and change the air intake path lengths by opening and closing the openings, and the rotation angles of the variable air intake valve bodies located on the side relatively close to the drive source are preferably larger than the rotation angles of the variable air intake valve bodies located on the side relatively opposite to the drive source when the plurality of variable air intake valve bodies are rotated from their open positions to their closed positions. According to this structure, both the variable air intake valve bodies on the side relatively opposite to the drive source and the variable air intake valve bodies on the side relatively close to the drive source can be brought into contact with the corresponding sealing surfaces, and hence the air intake path lengths can be properly changed. Consequently, a reduction in air intake efficiency resulting from variations in the dimensions of the valve bodies or the sealing surfaces can be effectively suppressed.

In the aforementioned air intake apparatus according to the aspect, the plurality of valve bodies preferably have the same shape as each other and are preferably provided in phases different from each other at their open positions such that the rotation angles of the valve bodies located on the side relatively close to the drive source are larger than the rotation angles of the valve bodies located on the side relatively opposite to the drive source. According to this structure, the valve bodies on the side opposite to the drive source can be easily brought into contact with the sealing surfaces before the valve bodies on the side close to the drive source simply by making the phases of the plurality of valve bodies at their open positions different from each other, and hence it is not necessary to make the positons where the plurality of valve bodies come into contact with the plurality of sealing surfaces different from each other. Consequently, complication of the shape of the air intake ports provided with the sealing surfaces can be suppressed.

According to the present application, in addition to the aforementioned air intake apparatus according to the aspect, another structure described below is conceivable.

In other words, an air intake apparatus according to another structure of the present application includes a plurality of air intake ports, a plurality of valve bodies arranged in the plurality of respective air intake ports, rotated between their open positions and their closed positions, a rotating shaft that rotates together with the plurality of valve bodies, and a common drive source that is connected to the rotating shaft and rotationally drives the plurality of valve bodies. The plurality of respective air intake ports include sealing surfaces that include inner wall surfaces with which the valve bodies come into contact at the closed positions of the valve bodies, and the positions of a plurality of sealing surfaces are made different from each other in the rotation direction of the valve bodies such that valve bodies located on a side relatively close to the drive source come into contact with corresponding sealing surfaces after valve bodies located on a side relatively opposite to the drive source come into contact with corresponding sealing surfaces when the plurality of valve bodies are rotated from their open position to their closed positions. According to this structure, even when variations in the dimensions of the valve bodies or the sealing surfaces are generated, the valve bodies on the side relatively opposite to the drive source can be easily brought into contact with the sealing surfaces before the valve bodies on the side relatively close to the drive source simply by making the positions of the plurality of sealing surfaces in the rotation direction of the valve bodies different from each other. Thus, after the valve bodies on the side opposite to the drive source come into contact with the sealing surfaces, the valve bodies on the side close to the drive source are further rotated, whereby both the valve bodies on the side opposite to the drive source and the valve bodies on the side close to the drive source can be brought into contact with the sealing surfaces. Consequently, a reduction in air intake efficiency resulting from variations in the dimensions of the valve bodies or the sealing surfaces can be suppressed.

Effect of the Invention

According to the present invention, as hereinabove described, a reduction in air intake efficiency resulting from variations in the dimensions of the valve bodies or the sealing surfaces can be suppressed.

BRIEF DESCRIPTION OF THE DRAWINGS

FIG. 6 A sectional view of the air intake apparatus according to the first embodiment of the present invention taken along a rotating shaft of a valve body.

FIG. 7 A schematic perspective view showing a state where four valve bodies of the air intake apparatus according to the first embodiment of the present invention are rotationally driven.

FIG. 8 A schematic view for illustrating the rotation angles of the four valve bodies from their open positions to their closed positions in the air intake apparatus according to the first embodiment of the present invention.

FIG. 9 A schematic view for illustrating the rotation angles of four valve bodies from their open positions to their closed positions in the air intake apparatus according to the second embodiment of the present invention.

FIG. 10 A schematic view showing the structure in which the protrusion heights of sealing members are made different from each other according to a first modification of the first and second embodiments of the present invention.

FIG. 11 A schematic view showing the structure in which shaft portions of adjacent valve bodies are directly connected to each other according to a second modification of the first and second embodiments of the present invention.

FIG. 12 A schematic view showing the structure in which no increased inner diameter portion is provided in a valve body according to a third modification of the first and second embodiments of the present invention.

MODES FOR CARRYING OUT THE INVENTION

Embodiments of the present invention are hereinafter described on the basis of the drawings.

(First Embodiment)

The structure of an air intake apparatus 100 according to a first embodiment of the present invention is described with reference to FIGS. 1 to 8.

Figure 1:
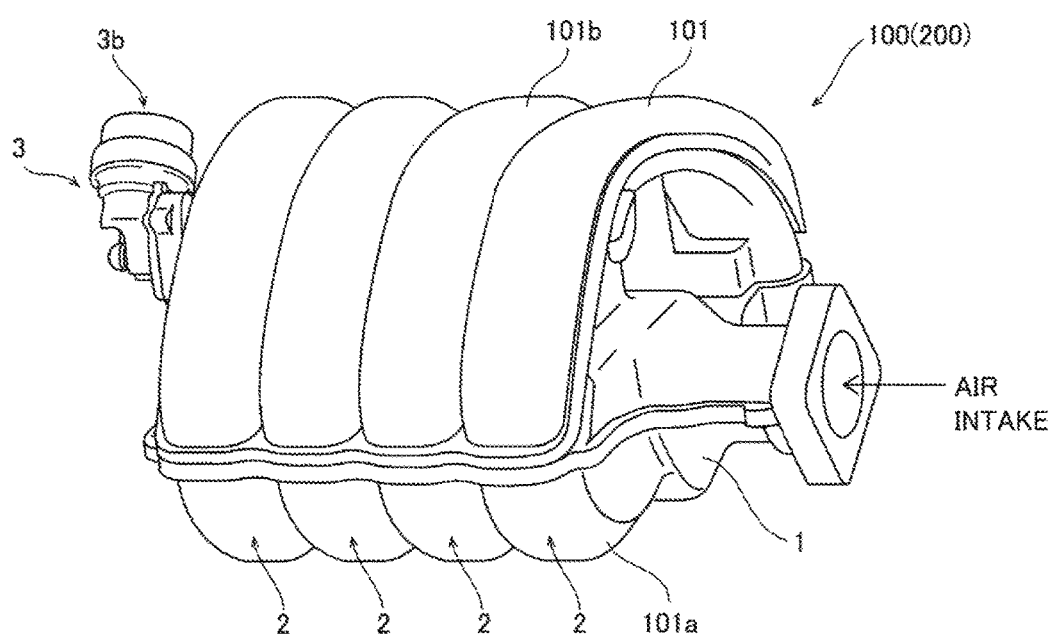
FIG. 1 A perspective view showing the structure of an air intake apparatus according to first and second embodiments of the present invention.
Figure 2:
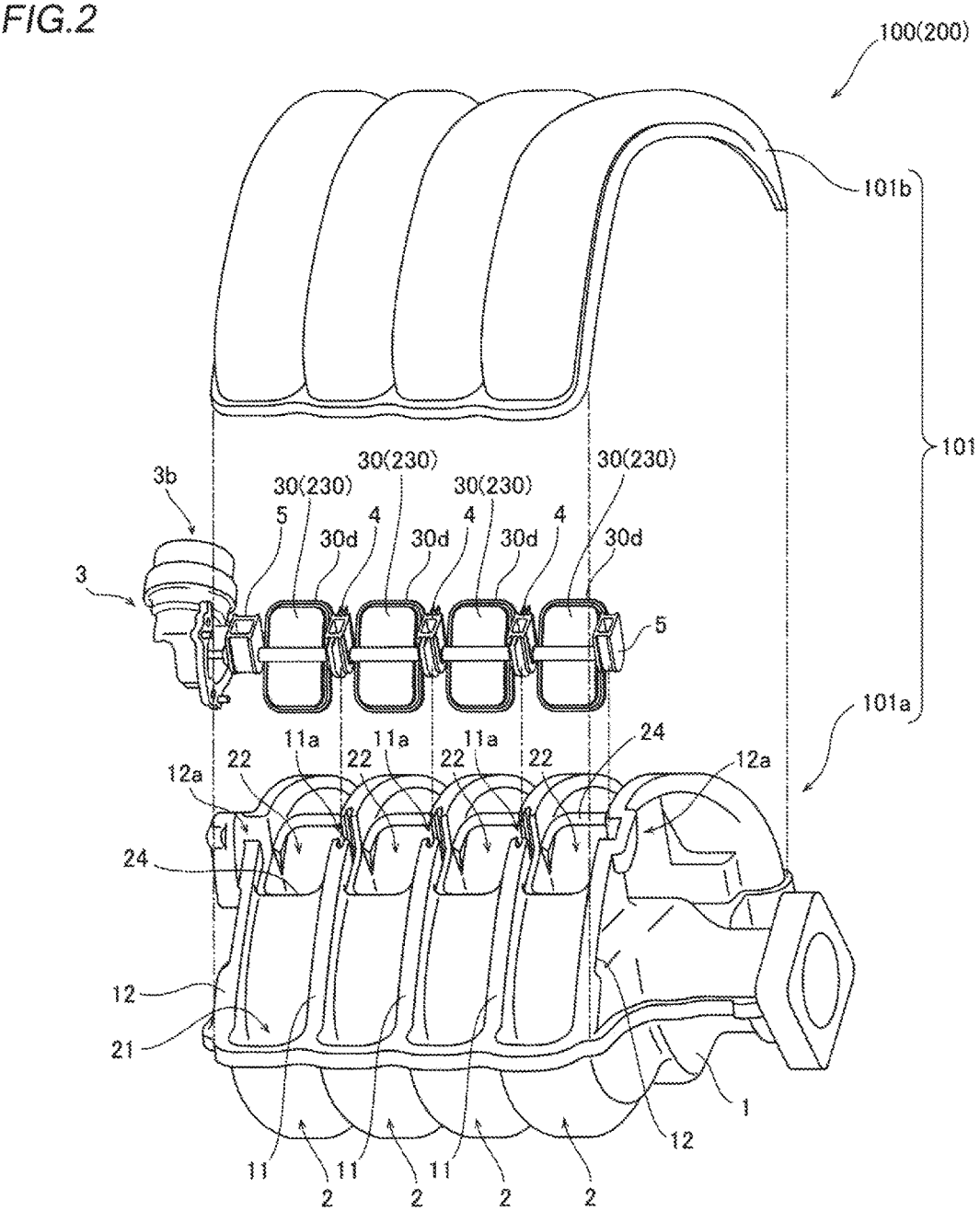
FIG. 2 An exploded perspective view showing the structure of the air intake apparatus according to the first and second embodiments of the present invention.
Figure 3:
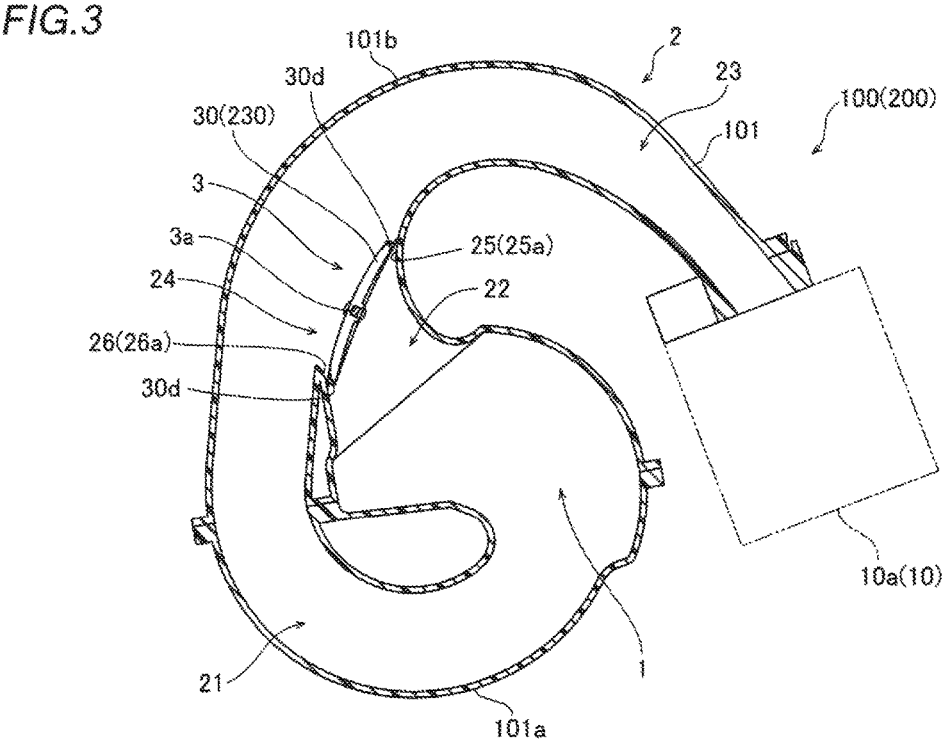
FIG. 3 A schematic sectional view of the air intake apparatus according to the first and second embodiments of the present invention taken along an air intake port.

The air intake apparatus 100 according to the first embodiment is an air intake apparatus provided in an automotive in-line four-cylinder engine 10 (see FIG. 3), as shown in FIGS. 1 to 3. The air intake apparatus 100 includes a surge tank 1, four air intake ports 2 that branches from the surge tank 1 and are arranged downstream of the surge tank 1, and an air intake control valve 3 provided in the four air intake ports 2. Structurally, the air intake apparatus 100 includes an air intake apparatus body 101 integrally including the surge tank 1 and the four air intake ports 2. As shown in FIGS. 2 and 3, the air intake control valve 3 is provided inside the air intake apparatus body 101. The air intake apparatus body 101 includes a body-side portion 101a and a cover portion 101b, and the body-side portion 101a and the cover portion 101b are integrally bonded to each other by vibration welding in a state where the air intake control valve 3 is attached to the body-side portion 101a. The air intake apparatus 100 is connected to a cylinder head 10a, and the four air intake ports 2 are connected to respective cylinders through the cylinder head 10a, as shown in FIG. 3.

Intake air arriving through an unshown air cleaner and an unshown throttle flows into the surge tank 1. Each of the four air intake ports 2 includes a first port portion 21, a second port portion 22, and an outlet port 23 connected to a cylinder of the engine 10 on the downstream side of the first port portion 21 and the second port portion 22. The first port portion 21 extends to detour from the surge tank 1 and is connected to the outlet port 23 on the downstream side. The second port portion 22 is provided to connect the surge tank 1 and the outlet port 23 through the air intake control valve 3.

As shown in FIGS. 2 and 3, the air intake control valve 3 is configured to open and close an opening 24 located between the surge tank 1 and an air intake port 2 (a connection portion between the second port portion 22 and the outlet port 23). Sealing surfaces 25 and 26 (see FIG. 3) including an inner wall surface with which a valve body 30 comes into contact at the closed position of the valve body 30 described later are provided on a portion of the air intake port 2 corresponding to the opening 24. Both the sealing surfaces 25 and 26 are inclined surfaces along the flow direction of intake air that moves from the second port portion 22 to the outlet port 23 in a state where the valve body 30 opens. A long port having a large air intake path length is formed of the first port portion 21 and the outlet port 23 in a state where the air intake control valve 3 closes, and a short port having a small air intake path length is formed of the second port portion 22 and the outlet port 23 in a state where the air intake control valve 3 opens, whereby the air intake control valve 3 is configured to be capable of changing the air intake path lengths. In other words, the air intake control valve 3 opens and closes the opening 24 thereby serving as an air intake control valve for variable air intake that changes the air intake path length to each cylinder of the engine 10. Thus, the air intake path lengths are changed according to the engine speed, the engine load, or the like, and a more appropriate amount of intake air can be supplied to the engine 10.

As shown in FIG. 2, three partition walls 11 arranged between the four air intake ports 2 are provided with bearing member holding portions 11a configured to hold first bearing members 4 described later. Furthermore, outer walls 12 of air intake ports 2 arranged on both sides are provided with bearing member holding portions 12a configured to hold second bearing members 5 described later.

Figure 4:
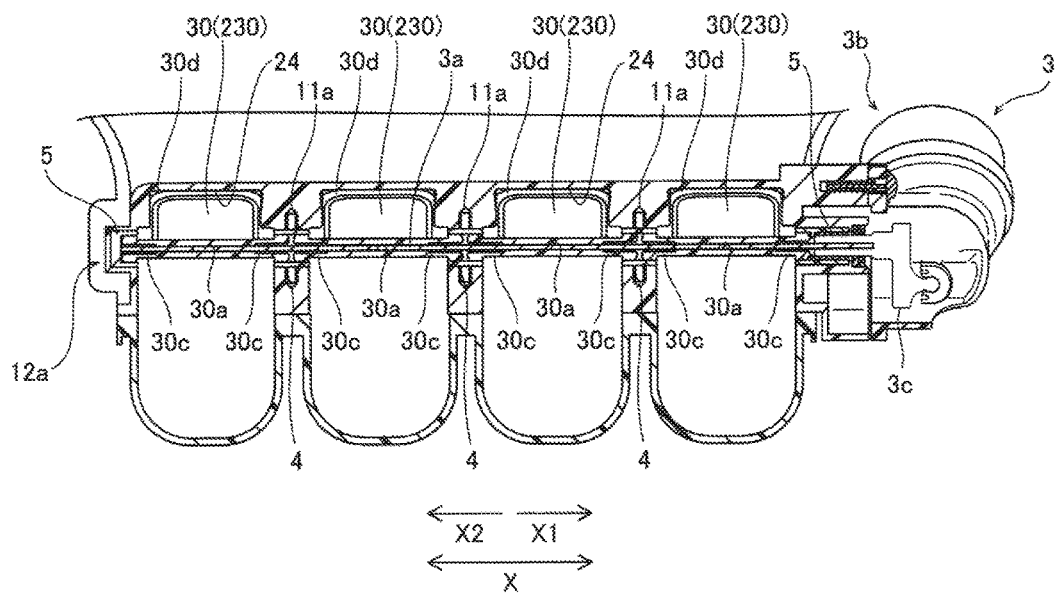
FIG. 4 A sectional view of the air intake apparatus according to the first and second embodiments of the present invention taken along a rotating shaft of an air intake control valve.

The air intake control valve 3 includes four valve bodies 30, a common rotating shaft 3a that rotates together with the four valve bodies 30, a common actuator 3b that rotationally drives the four valve bodies 30, and a link member 3c that transmits the drive force of the actuator 3b to the rotating shaft 3a, as shown in FIG. 4. The rotating shaft 3a extends in a direction orthogonal to the air intake ports 2 and is a square shaft, the vertical section of which, passing through four second port portions 22, is rectangular (square). The rotating shaft 3a is made of metal (such as stainless steel or an aluminum alloy) and can be torsionally deformed by the drive force of the actuator 3b. The rotating shaft 3a is rotatably supported by the second bearing members 5 described later in one end on a side which the actuator 3b is arranged and another end opposite thereto, as shown in FIGS. 2 and 4. The extensional axial direction of the rotating shaft 3a is hereinafter referred to as the direction X. The actuator 3b is a direct acting type negative pressure actuator and is connected to the rotating shaft 3a through the link member 3c. The actuator 3b is an example of the "drive source" in the present invention, and the valve bodies 30 are an example of the "variable air intake valve bodies" in the present invention.

Figure 5:
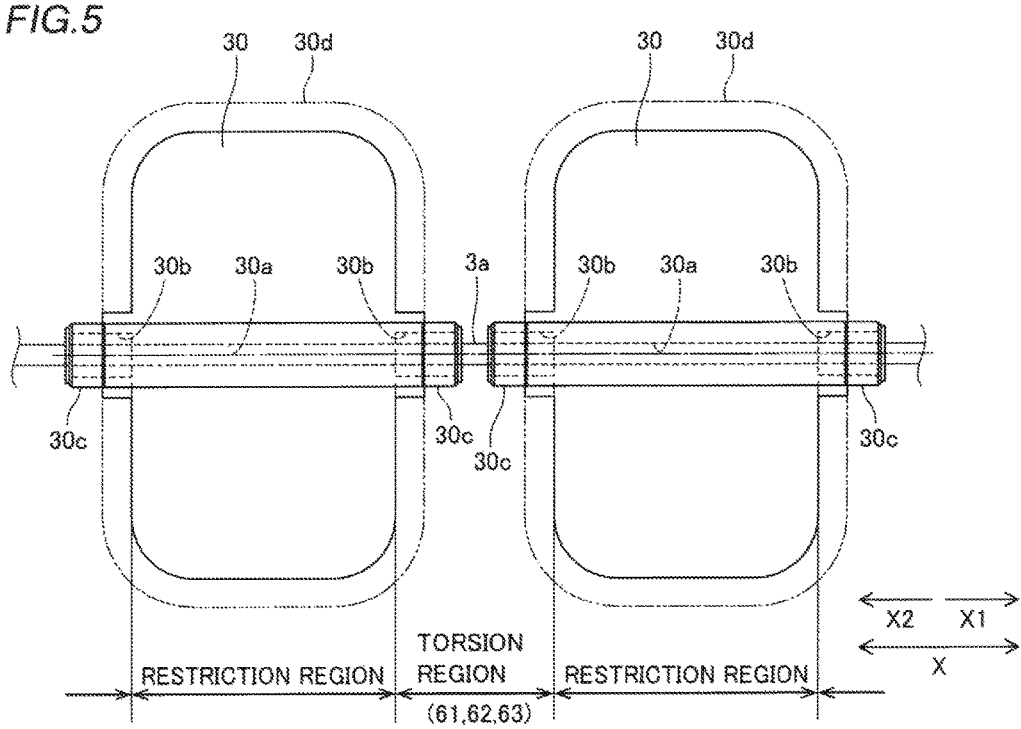
FIG. 5 A plan view showing two adjacent valve bodies of the air intake apparatus according to the first embodiment of the present invention.
Figure 5:
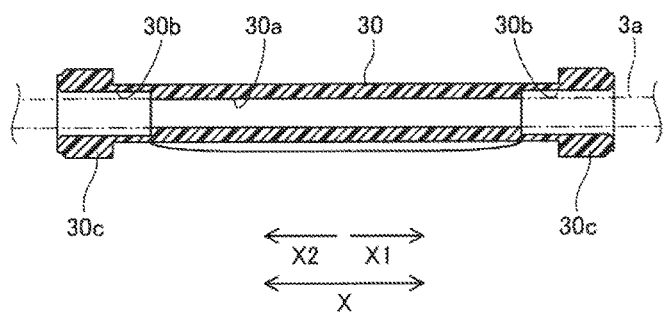

The valve bodies 30 (four in total) are provided in the respective four air intake ports 2. The valve bodies 30 are configured to be rotatable between their open positions and closed positions so as to open and close corresponding openings 24 between the surge tank 1 and the air intake ports 2, as shown in FIG. 3. The four valve bodies 30 are formed in the same shape as each other and have substantially rectangular outer shapes corresponding to the openings 24. The valve bodies 30 are plate-like members made of plastic (made of nylon 66 (PA66), for example). The valve bodies 30 are formed with shaft insertion portions 30a to cross central portions thereof in a longitudinal direction, as shown in FIGS. 4 to 6. The rotating shaft 3a is inserted (pressed) into the shaft insertion portions 30a, whereby the four valve bodies 30 are mounted on the rotating shaft 3a. The inner peripheral surfaces of the shaft insertion portions 30a each are in a rectangular shape corresponding to the outer shape of the rotating shaft 3a that is a square shaft, and the rotating shaft 3a and the inner peripheral surfaces of the shaft insertion portions 30a come into contact with each other, whereby the valve bodies 30 rotate integrally with the rotating shaft 3a. Both ends of the shaft insertion portions 30a are formed with increased inner diameter portions 30b having inner diameters large enough not to come into contact with the rotating shaft 3a in a state where the rotating shaft 3a is inserted thereinto. In other words, the torsional deformation of the rotating shaft 3a is restricted in the shaft insertion portions 30a but not in the increased inner diameter portions 30b.

The central portions of the valve bodies 30 in the longitudinal direction are integrally formed with shaft portions 30c that protrude outward in the axial direction (direction X) and have circular outer peripheral surfaces. The shaft portions 30c on both sides in the axial direction (direction X) are rotatably supported by the first bearing members 4 and the second bearing members 5 arranged on both sides of the valve bodies 30, as shown in FIG. 4. Thus, each of the valve bodies 30 is rotatably supported by the bearing members (the first bearing members 4 and the second bearing members 5). The four valve bodies 30 each include a sealing member 30d arranged in an outer peripheral portion of the valve body 30. Sealing members 30d of the four valve bodies 30 are formed in the same shape as each other and are made of elastically deformable rubber. The sealing members 30d of the valve bodies 30 come into contact with the corresponding sealing surfaces 25 and 26, whereby the airtightness of the openings 24 at the closed positions is improved.

The four valve bodies 30 of the air intake control valve and the sealing surfaces 25 (26) of the air intake ports 2 with which the sealing members 30d of the valve bodies 30 come into contact are now described in detail. According to the first embodiment, the four valve bodies 30 are configured to be rotationally driven by the actuator 3b in the same phase without providing differences in rotation angle. The four valve bodies 30 are mounted on the common rotating shaft 3a to be in the same phase as each other at their open positions. As shown in FIGS. 7 and 8, four valve bodies 31, 32, 33, and 34 come into contact with corresponding sealing surfaces 251 (261), 252 (262), 253 (263), and 254 (264), respectively, whereby the openings 24 are closed. In FIGS. 7 and 8, the sealing members 30d arranged in outer peripheral portions of the valve bodies 30 are omitted, but actually, the sealing members 30d come into contact with the sealing surfaces 25 (26) at the closed positions of the valve bodies 30.

When the four valve bodies 30 come into contact with the corresponding sealing surfaces 25 (26), the rotating shaft 3a is torsionally deformed. More specifically, the rotating shaft 3a is torsionally deformed in torsion regions 61, 62, and 63 (see FIG. 5) between the four valve bodies 30, and the torsional deformation is restricted by the inner peripheral surfaces of the shaft insertion portions 30a in restriction regions corresponding to the shaft insertion portions 30a of the valve bodies 30. The torsion regions 61, 62, and 63 include regions between two adjacent valve bodies 30 and regions corresponding to the increased inner diameter portions 30b of the valve bodies 30 located on both sides. Thus, the increased inner diameter portions 30b are provided in the valve bodies 30, whereby the torsion regions 61, 62, and 63 where torsional deformation is allowed are increased in size (area), and hence the rotating shaft 3a is easily torsionally deformed between the adjacent valve bodies 30.

The four sealing surfaces 25 (26) are provided at positions different from each other in the rotation direction of the valve bodies 30 such that the valve bodies 30 come into contact with the corresponding sealing surfaces 25 (26) in order from the valve body 31 farthest from the actuator 3b to the valve body 34 closest to the actuator 3b, as shown in FIGS. 7 and 8. In other words, positions where the four valve bodies 30 come into contact with the four sealing surfaces 25 (26) are different from each other in the rotation direction of the valve bodies 30. Specifically, the four sealing surfaces 25 (26) are provided at the positions different from each other such that the rotation angles from the open positions to the closed positions are increased in order of the valve bodies 31, 32, 33, and 34 from the valve body 31 farthest from the actuator 3b to the valve body 34 closest to the actuator 3b. In other words, the rotation angles of the four valve bodies 30 from their open positions to their closed positions are increased in stages in order of the rotation angle θ1 of the valve body 31, the rotation angle θ2 of the valve body 32, the rotation angle θ3 of the valve body 33, and the rotation angle θ4 of the valve body 34 from a side far from the actuator 3b to a side close to the actuator 3b. More specifically, the rotation angles of the valve bodies 30 located on a side relatively close to the actuator 3b (the side close to the actuator 3b) from their open positions to their closed positions are larger than the rotation angles of the valve bodies 30 located on a side relatively opposite to the actuator 3b (the side far from the actuator 3b).

The angular intervals of the rotation angles θ1 to θ4 of the four valve bodies 30 are increased in order from the valve body 31 farthest from the actuator 3b to the valve body 34 closest to the actuator 3b. More specifically, the angular intervals are increased in stages in order of the angular interval α (θ2−θ1) between the valve bodies 31 and 32, the angular interval β (θ3−θ2) between the valve bodies 32 and 33, and the angular interval γ (θ4−θ3) between the valve bodies 33 and 34 from the side far from the actuator 3b to the side close to the actuator 3b. In other words, the sealing surface 252 (262) of the valve body 32 is arranged at a position deviated by the angular interval α in a direction away from its open position with respect to the sealing surface 251 (261) of the valve body 31, and the sealing surface 253 (263) of the valve body 33 is arranged at a position deviated by the angular interval β in the direction away from its open position with respect to the sealing surface 252 (262) of the valve body 32. The sealing surface 254 (264) of the valve body 34 is arranged at a position deviated by the angular interval γ in the direction away from its open position with respect to the sealing surface 253 (263) of the valve body 33.

After the valve body 31 comes into contact with the sealing surface 251 (261), the rotating shaft 3a is torsionally deformed in the torsion regions 61 to 63 by the drive force of the actuator 3b when the subsequent valve body 32 comes into contact with the sealing surface 252 (262). After the valve body 32 comes into contact with the sealing surface 252 (262), the rotating shaft 3a is further torsionally deformed in the torsion regions 62 and 63 by the drive force of the actuator 3b, and the amount of torsional deformation is accumulated. Similarly, after the valve body 33 comes into contact with the sealing surface 253 (263), the rotating shaft 3a is further torsionally deformed in the torsion region 63 by the drive force of the actuator 3b, and the amount of torsional deformation is further accumulated. Thus, the angular intervals α, β, and γ are set in consideration of variations (acceptable values) in the dimensions of the valve bodies 30 and the sealing surfaces 25 (26) and a cumulative amount of torsional deformation such that the four valve bodies 30 come into contact with the corresponding sealing surfaces 25 (26) in order from the valve body 31 farthest from the actuator 3b to the valve body 34 closest to the actuator 3b. Due to the aforementioned structure, the four valve bodies 30 (the sealing members 30d (see FIG. 5)) come into contact with the corresponding sealing surfaces 25 (26) in order from the valve body 31 farthest from the actuator 3b to the valve body 34 closest to the actuator 3b when rotated from their open positions to their closed positions.

A rotating operation for rotating the four valve bodies 30 from their open positions to their closed positions is now described with reference to FIGS. 3, 7, and 8.

First, the actuator 3b rotationally drives the four valve bodies 30 in a state where the four valve bodies 30 are located at their open positions (a state shown by two-dot chain lines in FIG. 8). The four valve bodies 30 are rotationally driven in the same phase without providing the differences in rotation angle in a rotation range (a rotation range from 0 degrees to θ1 degrees based on the open positions) where the valve body 31 farthest from the actuator 3b comes into contact with the sealing surface 251 (261) from the open positions of the valve bodies 30. Then, the valve body 31 farthest from the actuator 3b comes into contact with the sealing surface 251 (261), and the corresponding opening 24 (see FIG. 3) is closed, as shown in FIGS. 7 and 8. Thereafter, the actuator 3b torsionally deforms the rotating shaft 3a in the torsion regions 61, 62, and 63, whereby the valve bodies 32 to 34 are further rotated, and the subsequent valve body 32 comes into contact with the sealing surface 252 (262). Similarly, after the valve body 32 comes into contact with the sealing surface 252 (262), the actuator 3b further torsionally deforms the rotating shaft 3a in the torsion regions 62 and 63, whereby the valve bodies 33 and 34 are further rotated, and the subsequent valve body 33 comes into contact with the sealing surface 253 (263). Thereafter, the actuator 3b further torsionally deforms the rotating shaft 3a in the torsion region 63, whereby the valve body 34 closest to the actuator 3b is further rotated and comes into contact with the sealing surface 254 (264). Thus, the openings 24 are closed in all the four air intake ports 2.

According to the first embodiment, as hereinabove described, the rotation angles of the valve bodies 30 located on the side (X1 direction side) relatively close to the actuator 3b from their open positions to their closed positions are larger than the rotation angles of the valve bodies 30 located on the side (X2 direction side) relatively opposite to the actuator 3b when the four valve bodies 30 are rotated from their open positions to their closed positions. Thus, even when variations in the dimensions of the valve bodies 30 or the sealing surfaces 25 (26) are generated, the rotation angles of the valve bodies 30 on the side relatively opposite to the actuator 3b are small, and hence the valve bodies 30 on the side relatively opposite to the actuator 3b can be brought into contact with the sealing surfaces 25 (26) before the valve bodies 30 on the side relatively close to the actuator 3b. Thus, after the valve bodies 30 on the side opposite to the actuator 3b come into contact with the sealing surfaces 25 (26), the valve bodies 30 on the side close to the actuator 3b are further rotated, whereby both the valve bodies 30 on the side opposite to the actuator 3b and the valve bodies 30 on the side close to the actuator 3b can be brought into contact with the sealing surfaces 25 (26). Consequently, a reduction in air intake efficiency resulting from variations in the dimensions of the valve bodies 30 or the sealing surfaces 25 (26) can be suppressed.

According to the first embodiment, as hereinabove described, the rotation angles of the valve bodies 30 located on the side relatively close to the actuator 3b are larger than the rotation angles of the valve bodies 30 located on the side relatively opposite to the actuator 3b such that the valve bodies 30 located on the side (X1 direction side) relatively close to the actuator 3b come into contact with the corresponding sealing surfaces 25 (26) after the valve bodies 30 located on the side (X2 direction side) relatively opposite to the actuator 3b come into contact with the corresponding sealing surfaces 25 (26) when the four valve bodies 30 are rotated from their open positions to their closed positions. Thus, the valve bodies 30 on the side relatively opposite to the actuator 3b can be reliably brought into contact with the sealing surfaces 25 (26) before the valve bodies 30 on the side relatively close to the actuator 3b even when variations in the dimensions of the valve bodies 30 or the sealing surfaces 25 (26) are generated, and hence both the valve bodies 30 on the side close to the actuator 3b and the valve bodies 30 on the side opposite to the actuator 3b can be more reliably brought into contact with the sealing surfaces 25 (26).

According to the first embodiment, as hereinabove described, the positions where the four valve bodies 30 come into contact with the sealing surfaces 25 (26) of the four air intake ports 2 are made different from each other such that the valve bodies 30 located on the side (X1 direction side) relatively close to the actuator 3b come into contact with the corresponding sealing surfaces 25 (26) after the valve bodies 30 located on the side (X2 direction side) relatively opposite to the actuator 3b come into contact with the corresponding sealing surfaces 25 (26). Thus, the rotation angles of the valve bodies 30 on the side close to the actuator 3b can be easily made larger than the rotation angles of the valve bodies on the side opposite to the actuator 3b simply by making the positions where the four valve bodies 30 come into contact with the sealing surfaces 25 (26) different from each other, and hence the valve bodies 30 on the side opposite to the actuator 3b can be easily brought into contact with the sealing surfaces 25 (26) before the valve bodies 30 on the side close to the actuator 3b. Furthermore, unlike the case where the rotation angles of the four valve bodies 30 are made different from each other by providing the four valve bodies 30 in phases (rotation angular positions) different from each other at their open positions, the four valve bodies 30 can be provided in a prescribed phase (same phase) where pressure losses in air intake are hardly increased at their open positions, and hence pressure losses in air intake in the open states can be suppressed from being increased by the four valve bodies 30.

According to the first embodiment, as hereinabove described, the positions where the four valve bodies 30 come into contact with the sealing surfaces 25 (26) are made different from each other such that the elastically deformable sealing members 30d of the valve bodies 30 located on the side (X1 direction side) relatively close to the actuator 3b come into contact with the corresponding sealing surfaces 25 (26) after the elastically deformable sealing members 30d of the valve bodies 30 located on the side (X2 direction side) relatively opposite to the actuator 3b come into contact with the corresponding sealing surfaces 25 (26). Thus, the elastically deformable sealing members 30d of the four valve bodies 30, having the same shape, are brought into contact with the sealing surfaces 25 (26) sequentially from the side opposite to the actuator 3b to the side close to the actuator 3b, whereby sealing performance between the valve bodies 30 and the sealing surfaces 25 (26) can be improved by the elastic deformation of the sealing members 30d, and hence a reduction in air intake efficiency resulting from variations in the dimensions of the valve bodies 30 or the sealing surfaces 25 (26) can be further suppressed.

According to the first embodiment, as hereinabove described, the four valve bodies 30 are configured to be rotationally driven by the actuator 3b in the same phase without providing the differences in rotation angle, and the rotating shaft 3a is configured to be torsionally deformable when the valve bodies 30 located on the side relatively close to the actuator 3b come into contact with the corresponding sealing surfaces 25 (26). Thus, even in the case where the four valve bodies 30 are rotationally driven by the actuator 3b in the same phase, the valve bodies 30 on the side close to the actuator 3b can be further rotated, using the torsional deformation of the rotating shaft 3a after the valve bodies 30 on the side relatively opposite to the actuator 3b come into contact with the sealing surfaces 25 (26), and hence both the valve bodies 30 on the side close to the actuator 3b and the valve bodies 30 on the side opposite to the actuator 3b can be easily brought into contact with the corresponding sealing surfaces 25 (26).

According to the first embodiment, as hereinabove described, the rotation angles of the four valve bodies 30 from their open positions to their closed positions are increased in order from the valve body 31 farthest from the actuator 3b to the valve body 34 closest to the actuator 3b such that the valve bodies 30 come into contact with the corresponding sealing surfaces 25 (26) in order from the valve body 31 farthest from the actuator 3b to the valve body 34 closest to the actuator 3b. Thus, of all the four valve bodies 30, the valve bodies 30 on the side relatively opposite to the actuator 3b can be brought into contact with the sealing surfaces 25 (26) before the valve bodies 30 on the side relatively close to the actuator 3b, and hence all the four valve bodies 30 can be effectively brought into contact with the corresponding sealing surfaces 25 (26).

According to the first embodiment, as hereinabove described, the positions where the four valve bodies 30 come into contact with the corresponding sealing surfaces 25 (26) are made different from each other such that the rotation angles of the four valve bodies 30 from their open positions to their closed positions are increased in order from the valve body 31 farthest from the actuator 3b to the valve body 34 closest to the actuator 3b. Thus, of all the four valve bodies 30, the valve bodies 30 on the side relatively opposite to the actuator 3b can be easily brought into contact with the sealing surfaces 25 (26) before the valve bodies 30 on the side relatively close to the actuator 3b simply by making the positions where the four valve bodies 30 come into contact with the corresponding sealing surfaces 25 (26) different from each other.

According to the first embodiment, as hereinabove described, the rotation angles of the four valve bodies 30 from their open positions to their closed positions are increased in order from the valve body 31 farthest from the actuator 3b to the valve body 34 closest to the actuator 3b, and the angular intervals are increased in order from the valve body 31 farthest from the actuator 3b to the valve body 34 closest to the actuator 3b. Thus, even in the case where the valve bodies 30 on the side close to the actuator 3b are brought into contact with the sealing surfaces 25 (26) in order, using the torsional deformation of the rotating shaft 3a after the valve body 31 farthest from the actuator 3b comes into contact with the sealing surfaces 25 (26), the angular intervals are increased toward the side of the actuator 3b where the amount of torsion of the rotating shaft 3a is accumulated and increased, and hence the valve bodies 30 on the side relatively close to the actuator 3b can be suppressed from coming into contact with the sealing surfaces 25 (26) before the valve bodies 30 on the side relatively opposite to the actuator 3b due to the angular intervals smaller than cumulative amounts of torsion.

(Second Embodiment)

An air intake apparatus 200 according to a second embodiment of the present invention is now described with reference to FIGS. 1 to 3 and 9. In this second embodiment, the structure in which four valve bodies 230 are provided in phases different from each other at their open positions is described, unlike the aforementioned first embodiment.

The four valve bodies 230 of the air intake apparatus 200 (see FIGS. 1 to 3) according to the second embodiment are configured to come into contact with corresponding sealing surfaces 25a and 26a so as to close corresponding openings 24, as shown in FIG. 9. The sealing surfaces 25a (26a) of four air intake ports 2 are provided at the same position as each other in the rotation direction of the valve bodies 230, unlike the aforementioned first embodiment. In other words, positions where the four valve bodies 230 come into contact with the four sealing surfaces 25a (26a) are the same as each other in the rotation direction of the valve bodies 230. The valve bodies 230 are an example of the "variable air intake valve bodies" in the present invention.

The four valve bodies 230 are configured such that the rotation angles thereof from their open positions to their closed positions are increased in order of valve bodies 231, 232, 233, and 234 from the valve body 231 farthest from an actuator 3b to the valve body 234 closest to the actuator 3b. In other words, the rotation angles of the four valve bodies 230 from their open positions to their closed positions are increased in stages in order of the rotation angle θ11 of the valve body 231, the rotation angle θ12 of the valve body 232, the rotation angle θ13 of the valve body 233, and the rotation angle θ14 of the valve body 234 from a side far from the actuator 3b to a side close to the actuator 3b.

The angular intervals of the rotation angles θ11 to θ14 of the four valve bodies 230 are increased in order from the valve body 231 farthest from the actuator 3b to the valve body 234 closest to the actuator 3b.

Specifically, the angular intervals are increased in stages in order of the angular interval α1 (θ12−θ11) between the valve bodies 231 and 232, the angular interval β1 (θ13−θ12) between the valve bodies 232 and 233, and the angular interval γ1 (θ14−θ13) between the valve bodies 233 and 234 from the side far from the actuator 3b to the side close to the actuator 3b. The four valve bodies 230 are arranged in the phases different from each other at their open positions. More specifically, at the open positions of the four valve bodies 230, the valve body 232 is arranged at a position deviated by the angular interval α1 in a direction away from a sealing surface 25a (26a) with respect to the valve body 231, and the valve body 233 is arranged at a position deviated by the angular interval β1 in a direction away from a sealing surface 25a (26a) with respect to the valve body 232. The valve body 234 is arranged at a position deviated by the angular interval γ1 in a direction away from a sealing surface 25a (26a) with respect to the valve body 233. According to this structure, the four valve bodies 230 come into contact with the corresponding sealing surfaces 25a (26a) in order from the valve body 231 farthest from the actuator 3b to the valve body 234 closest to the actuator 3b when rotated from their open positions to their closed positions.

The remaining structure of the second embodiment is similar to that of the aforementioned first embodiment.

According to the second embodiment, as hereinabove described, the four valve bodies 230 are provided in the phases different from each other at their open positions such that the rotation angles of the valve bodies 230 located on a side (X1 direction side) relatively close to the actuator 3b are larger than the rotation angles of the valve bodies 230 located on a side (X2 direction side) relatively opposite to the actuator 3b. Thus, the valve bodies 230 on the side opposite to the actuator 3b can be easily brought into contact with the sealing surfaces 25a (26a) before the valve bodies 230 on the side close to the actuator 3b simply by making the phases of the four valve bodies 230 at their open positions different from each other, and hence it is not necessary to make the positons where the four valve bodies 230 come into contact with the corresponding sealing surfaces 25a (26a) different from each other. Consequently, complication of the shape of the air intake ports 2 provided with the sealing surfaces 25a (26a) can be suppressed.

Furthermore, similarly to the aforementioned first embodiment, in the structure according to the second embodiment, the rotation angles of the valve bodies 230 located on the side (X1 direction side) relatively close to the actuator 3b from their open positions to their closed positions are made larger than the rotation angles of the valve bodies 230 located on the side (X2 direction side) relatively opposite to the actuator 3b when the four valve bodies 230 are rotated from their open positions to their closed positions, whereby both the valve bodies 230 on the side close to the actuator 3b and the valve bodies 230 on the side opposite to the actuator 3b can be brought into contact with the sealing surfaces 25a (26a), and hence a reduction in air intake efficiency resulting from variations in the dimensions of the valve bodies 230 or the sealing surfaces 25a (26a) can be suppressed.

The remaining effects of the second embodiment are similar to those of the aforementioned first embodiment.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the example of applying the air intake apparatus according to the present invention to the automotive in-line four-cylinder engine has been shown in each of the aforementioned first and second embodiments, the present invention is not restricted to this. The air intake apparatus according to the present invention may be applied to an internal-combustion engine other than the automotive engine or may be applied to an internal-combustion engine other than the in-line four-cylinder engine.

While the example of applying the valve bodies according to the present invention to the air intake control valve that changes the air intake path lengths has been shown in each of the aforementioned first and second embodiments, the present invention is not restricted to this. The valve bodies according to the present invention may be applied to other than the air intake control valve that changes the air intake path lengths, such as a TCV (tumble control valve) that generates a longitudinal vortex or an SCV (swirl control valve) that generates a transverse vortex.

While the example of making the rotation angles of the valve bodies on the side relatively close to the actuator (drive source) larger than the rotation angles of the valve bodies on the side relatively opposite to the actuator by providing the sealing surfaces of the four air intake ports at the positions different from each other in the aforementioned first embodiment and by providing the four valve bodies in the phases different from each other at their open positions in the aforementioned second embodiment has been shown, the present invention is not restricted to this. According to the present invention, as in a first modification shown in FIG. 10, for example, the rotation angles of valve bodies 330 on a side relatively close to an actuator may be made larger than the rotation angles of valve bodies 330 on a side relatively opposite to the actuator by forming sealing members 30e, 30f, 30g, and 30h of four valve bodies 330 to have protrusion heights different from each other. Alternatively, the rotation angles of the valve bodies on the side relatively close to the actuator may be made larger than the rotation angles of the valve bodies on the side relatively opposite to the actuator by making the shapes of the valve bodies different from each other.

While the example of providing the rotating shaft that is made of metal and rotates together with the four valve bodies has been shown in each of the aforementioned first and second embodiments, the present invention is not restricted to this. According to the present invention, as in a second modification shown in FIG. 11, shaft portions 430c of adjacent valve bodies 430 may be directly connected to each other without providing the rotating shaft made of metal. In this case, the shaft portions 430c of the two valve bodies 430 coupled to each other may be configured to be torsionally deformable and be allowed to serve as the rotating shaft according to the present invention.

While the example of increasing the torsion regions between the valve bodies in size by providing the increased inner diameter portions 30b (see FIG. 6) in the valve bodies has been shown in each of the aforementioned first and second embodiments, the present invention is not restricted to this. According to the present invention, as in a third modification shown in FIG. 12, no increased inner diameter portion may be provided. In this case, a region between an end of a shaft portion 530c of one valve body 530 and an end of a shaft portion 530c of another valve body 530 serves as a torsion region.

While the example of connecting the actuator (drive source) common to the four valve bodies to one end of the rotating shaft has been shown in each of the aforementioned first and second embodiments, the present invention is not restricted to this. According to the present invention, the actuator common to a plurality of valve bodies may be arranged between the plurality of valve bodies and be connected to a central portion of the rotating shaft.

While the direct acting type negative pressure actuator has been shown as the example of the drive source according to the present invention in each of the aforementioned first and second embodiments, the present invention is not restricted to this. According to the present invention, a drive source other than the direct acting type negative pressure actuator may be employed so far as the same is a drive source that rotationally drives a plurality of valve bodies.

While the example of increasing the rotation angles of the four valve bodies from their open positions to their closed positions in order from the valve body farthest from the actuator (drive source) to the valve body closest to the actuator has been shown in each of the aforementioned first and second embodiments, the present invention is not restricted to this. According to the present invention, it is only required that the rotation angle of a valve body located on the side relatively close to the actuator of at least two valve bodies rotationally driven by the common actuator be larger than the rotation angle of a valve body located on the side relatively opposite to the actuator of at least the two valve bodies rotationally driven by the common actuator.

REFERENCE NUMERALS

1: surge tank
2: air intake port
3a: rotating shaft
3b: actuator (drive source)
24: opening
25, 25a, 26, 26a: sealing surface
30 (31, 32, 33, 34), 230 (231, 232, 233, 234), 330, 430, 530: valve body (variable air intake valve body)
30d: sealing member
100, 200: air intake apparatus

The invention claimed is:
1. An air intake apparatus comprising:
a plurality of air intake ports;
a plurality of valve bodies arranged in the plurality of air intake ports, rotated between their open positions and their closed positions;
a rotating shaft that is inserted into a shaft insertion portion provided in each of the plurality of valve bodies, is fixed into the shaft insertion portion so as not to be torsionally deformable, and rotates together with the plurality of valve bodies; and
a common drive source that is connected to the rotating shaft and rotationally drives the plurality of valve bodies, wherein
the plurality of respective air intake ports include sealing surfaces that include inner wall surfaces with which the valve bodies come into contact at the closed positions of the valve bodies,
rotation angles of the valve bodies located on a side relatively close to the drive source from their open positions to their closed positions are larger than the rotation angles of the valve bodies located on a side relatively opposite to the drive source when the plurality of valve bodies are rotated from their open positions to their closed positions,
there are three or more of the air intake ports and three or more of the valve bodies,
of at least two of the three or more valve bodies, the rotation angle of the valve body located on the side relatively close to the drive source is larger than the rotation angle of the valve body located on the side relatively opposite to the drive source,
the rotation angles of the plurality of valve bodies from their open positions to their closed positions are increased in order from the valve body farthest from the drive source to the valve body closest to the drive source such that the valve bodies come into contact with the corresponding sealing surfaces in order from the valve body farthest from the drive source to the valve body closest to the drive source,
the rotation angles of the plurality of valve bodies from their open positions to their closed positions are increased in order from the valve body farthest from the drive source to the valve body closest to the drive source, and angular intervals are increased in order from the valve body farthest from the drive source to the valve body closest to the drive source,
increased inner diameter portions provided on both ends of the shaft insertion portion and each of the increased inner diameter portions having an inner diameter so as not to come into contact with the rotating shaft in a state where the rotating shaft is inserted into the shaft insertion portion, and
wherein the rotating shaft is configured to be torsionally deformable between the increased inner diameter portions that face each other between the plurality of valve bodies adjacent to each other when the plurality of valve bodies come into contact with the corresponding sealing surfaces.

2. The air intake apparatus according to claim 1, wherein the rotation angles of the valve bodies located on the side relatively close to the drive source are larger than the rotation angles of the valve bodies located on the side relatively opposite to the drive source such that the valve bodies located on the side relatively close to the drive source come into contact with the corresponding sealing surfaces after the valve bodies located on the side relatively opposite to the drive source come into contact with the corresponding sealing surfaces when the plurality of valve bodies are rotated from their open positions to their closed positions.

3. The air intake apparatus according to claim 2, wherein positions where the plurality of valve bodies come into contact with a plurality of the sealing surfaces are made different from each other such that the valve bodies located on the side relatively close to the drive source come into contact with the corresponding sealing surfaces after the valve bodies located on the side relatively opposite to the drive source come into contact with the corresponding sealing surfaces.

4. The air intake apparatus according to claim 3, wherein the plurality of valve bodies include a plurality of sealing members that are arranged in respective outer peripheral portions of the plurality of valve bodies, come into contact with the corresponding sealing surfaces, have the same shape, and are elastically deformable, and
the positions where the plurality of valve bodies come into contact with the plurality of sealing surfaces are made different from each other such that the sealing members of the valve bodies located on the side relatively close to the drive source come into contact with the corresponding sealing surfaces after the sealing members of the valve bodies located on the side relatively opposite to the drive source come into contact with the corresponding sealing surfaces.

5. The air intake apparatus according to claim 3, wherein the plurality of valve bodies arranged in the plurality of air intake ports are configured to be rotationally driven by the drive source in the same phase without providing differences in rotation angle.

6. The air intake apparatus according to claim 1, wherein positions where the plurality of valve bodies come into contact with the plurality of sealing surfaces are made different from each other such that the rotation angles of the plurality of valve bodies from their open positions to their closed positions are increased in order from the valve body farthest from the drive source to the valve body closest to the drive source.

7. The air intake apparatus according to claim 1, wherein the plurality of valve bodies include a plurality of variable air intake valve bodies that are rotatably provided to open and close openings between a surge tank and the air intake ports arranged downstream of the surge tank and change air intake path lengths by opening and closing the openings, and the rotation angles of the variable air intake valve bodies located on the side close to the drive source are larger than the rotation angles of the variable air intake valve bodies located on the side opposite to the drive source when the plurality of variable air intake valve bodies are rotated from their open positions to their closed positions.

8. The air intake apparatus according to claim 1, wherein the plurality of valve bodies have the same shape as each other and are provided in phases different from each other at their open positions such that the rotation angles of the valve bodies located on the side close to the drive source are larger than the rotation angles of the valve bodies located on the side opposite to the drive source.

* * * * *